United States Patent
Burcham et al.

(10) Patent No.: US 10,313,828 B1
(45) Date of Patent: Jun. 4, 2019

(54) SYSTEMS AND METHODS FOR OPERATION OF NETWORK LOCATION SERVICES VIA TRANSLATION OF NETWORK TELEMETRY

(71) Applicant: Sprint Communications Company L.P., Overland Park, KS (US)

(72) Inventors: Robert Burcham, Overland Park, KS (US); Jason Delker, Olathe, KS (US); Matthew Habiger, Kansas City, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/724,245

(22) Filed: Oct. 3, 2017

(51) Int. Cl.
*H04W 24/00* (2009.01)
*H04W 4/021* (2018.01)
*H04L 29/08* (2006.01)
*H04W 4/02* (2018.01)
*H04W 88/02* (2009.01)

(52) U.S. Cl.
CPC ............ *H04W 4/021* (2013.01); *H04L 67/18* (2013.01); *H04W 4/023* (2013.01); *H04W 88/02* (2013.01)

(58) Field of Classification Search
CPC ................................ H04W 4/02; H04W 64/00
USPC ................................ 455/456.1, 456.2, 456.3
See application file for complete search history.

(56) References Cited

U.S. PATENT DOCUMENTS

| | | | |
|---|---|---|---|
| 9,852,443 B1 * | 12/2017 | Vaynblat | G06Q 30/0261 |
| 9,898,763 B1 * | 2/2018 | Vaynblat | G06Q 30/0261 |
| 10,045,159 B2 * | 8/2018 | Chao | H04W 4/029 |
| 2013/0297422 A1 * | 11/2013 | Hunter | G06Q 30/0261 705/14.58 |
| 2014/0162692 A1 * | 6/2014 | Li | H04L 67/40 455/456.3 |
| 2014/0164124 A1 * | 6/2014 | Rhoads | H04W 4/02 705/14.58 |
| 2015/0141045 A1 * | 5/2015 | Qiu | H04W 4/021 455/456.1 |
| 2017/0245106 A1 * | 8/2017 | Connelly | H04W 4/021 |

* cited by examiner

*Primary Examiner* — Temica M Beamer

(57) ABSTRACT

Systems and methods discussed herein are directed towards more efficient processing of user equipment (UE) data received in a native network telemetry data form. This data is stored and is selectively translated upon request to a different form such as longitude and latitude. The selective translation may be based on a request for a particular range of data that may fall into a geofence, which may be dynamically adjusted over time.

17 Claims, 7 Drawing Sheets

SYSTEMS AND METHODS FOR OPERATION OF NETWORK LOCATION SERVICES VIA TRANSLATION OF NETWORK TELEMETRY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications service providers store and maintain location information for devices supported by the providers. This location information may be received from cell sites on an ongoing basis, and may be stored, parsed, and analyzed by the provider or at the request of third parties. Location information received by a provider may be used to establish geofences that can be used by the provider and/or third parties as the basis for further analysis and/or content distribution.

SUMMARY

In an embodiment, a system for maintaining location services, comprising: an application stored in a non-transitory memory of a telecommunications provider server and executable by a processor to: receive a plurality of location information expressed as a plurality of network telemetry values from a plurality of user equipment (UE); store the plurality of location information; receive a request for identification information of UE within a geographic location expressed using a plurality of latitudes and a plurality of longitudes; and translate the request into corresponding network telemetry values. In an embodiment, the application is further configured to: analyze the stored plurality of location information based on the translated request; identify, based on the analysis, a portion of the plurality of location information that corresponds to the request and the UEs of the plurality of UE associated with the identified portion of the plurality of location information; translate, by the application, the identified portion of location information into a plurality of latitudes and a plurality of longitudes; and transmit, by the application, the identification information of the UEs of the plurality of UE associated with the identified portion of the plurality of location information.

In an embodiment, a method of maintaining location services, comprising: receiving, by an application stored in a non-transitory memory of a telecommunications provider server, a request comprising content and a geofence expressed using a plurality of latitudes and a plurality of longitudes; translating, by the application, the request into corresponding network telemetry values; and analyzing, by the application, memory in response to receipt of the request, a plurality of location information associated with a plurality of user equipment (UE) and stored in the non-transitory memory. In an embodiment, the method further comprises identifying, by the application, based on the analysis, a cell site associated with the plurality of location information; receiving, by the application, from the identified cell site, a plurality of location information from a plurality of UE in communication with the identified cell site; and translating, by the application, the plurality of location information received from the identified cell site to a corresponding plurality of latitudes and longitudes.

In an embodiment, a method of maintaining location services, comprising: receiving, by an application stored in a non-transitory memory of a telecommunications provider server, a request to distribute content to user equipment (UE) in a target area, wherein the target area is expressed using a plurality of latitudes and a plurality of longitudes and comprises a geofence; translating, by the application, the request into a corresponding native network telemetry data form; and, in response to receipt of the request, analyzing, by the application, a plurality of location information received for a plurality of UE by a plurality of cell sites, wherein the plurality of location information is received in the native network telemetry data form. In an embodiment, the method further comprises: identifying, by the application, based on the analyzing, a portion of the plurality of location information that corresponds to the geofence; identifying, by the application, UEs of the plurality of UE associated with the portion of the plurality of location information; and translating, by the application, the portion of location information into a plurality of latitudes and a plurality of longitudes, wherein the identified UEs receive the content subsequent to translating the portion of location information. In an embodiment, the method further comprises: receiving and analyzing, by the application, from the identified UEs, a plurality of content receipt data comprising at least one of an indication of whether the content was received by the UE and a location of the UE when the content was received; and modifying, subsequent to the analyzing of the plurality of content receipt data, the geofence.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
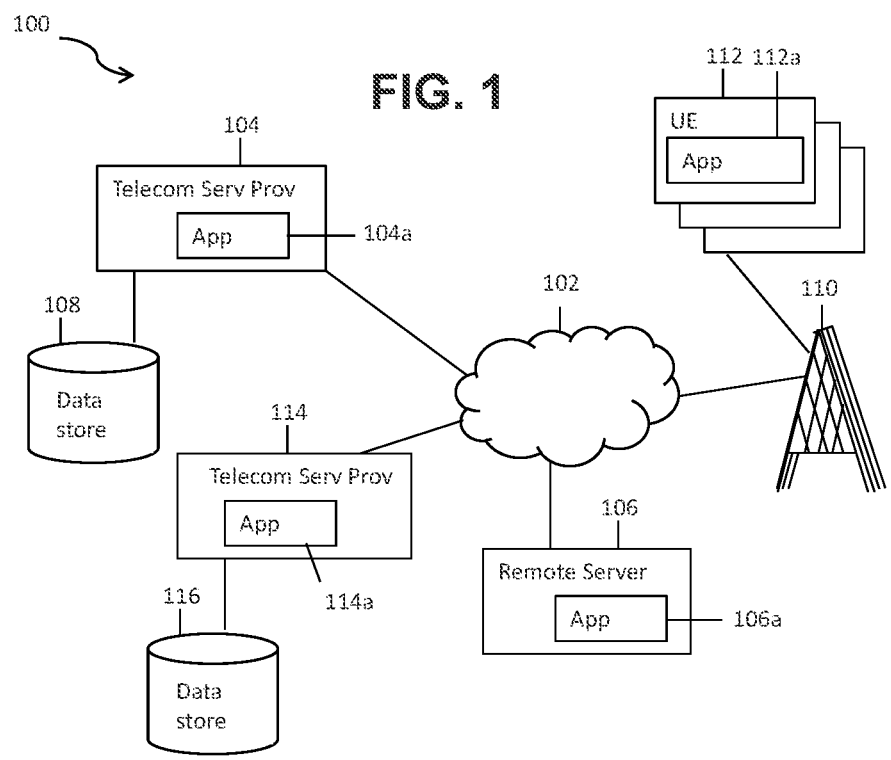
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The gathering and efficient processing of large amounts of data obtained by telecommunications service providers from a plurality of user equipment (UE) may involve a high cost due to the receipt, processing, storage, and analysis of the data, and because of the desire for accuracy in each stage of that process. Each UE of the plurality of UE may be configured to send, automatically on a schedule preset by the telecommunications service provider or in response to being pinged by the provider, a plurality of geolocation information to the provider. This location information (e.g., information about the location of the UE) may be transmitted in a native network telemetry data form and stored. The stored information may be subsequently queried by the provider, either of its own volition or in response to requests by vendors or other third parties for content distribution.

Previously employed methods and systems, for tracking and translating the network coordinates sent by the plurality of UE, translate and then store every instance that a location is tracked in a universal coordinate system, which can result in millions of data points/locations being translated and stored per hour. Every time a geolocation is received the coordinates of the UE are translated from the native network telemetry data form to a universal coordinate system. The majority of this translated data is never requested by third parties nor used by the telecommunications service provider. The network telemetry data is obtained based on radio signal strength, and multiple cell sites may receive a signal from and/or transmit a signal to a UE. The strength of signals received from a UE by a plurality of cell sites may be used to translate the signal data by performing a trilateration calculation to determine longitude and latitude coordinates of the UE from which the signal(s) is received. Subsequently, when a query is received by the system for a desired location or range of locations, the location is provided in the translated coordinates without the need for further translation. This presents several challenges, including the amount of processing power, time, and cost that goes into translating every geolocation received from every UE supported by a provider's network across multiple brands and platforms. The systems and methods discussed herein address these issues by selectively translating data received in native network telemetry form based on queries received for UE geolocation.

As used herein, a "geofence" is a dynamically adjusted geographic area defined by a plurality of cell sites selected to form a polygon that may be associated with UE performance and user behavior/patterns. For example, a geofence around a NFL football stadium may be defined by 10 cell sites proximate to the stadium that may be deemed to provide wireless communication service coverage to UEs in the stadium and in a parking lot proximate to the stadium. Geofences may be employed by telecommunications service providers to distribute content including advertisements from third parties, as well as to distribute offers and/or software update notifications or other notifications from the provider. A geofence may be defined to have any arbitrary shape based on the selection of cell sites deemed to define the geofence. The geofence may further be defined by a portion of a cell site (e.g., one sector of three cell sectors of the cell site or two sectors of the three cell sectors of the cell site or by defining a range of received signal strengths deemed to be in the geofence).

Using the systems and methods discussed herein, the location processing of the telecommunications service provider is improved, at least by saving processing power, time, and cost. This improvement stems from the ability of the new system to (1) receive the plurality of locations from the plurality of UE; (2) store the plurality of locations in their native data form; and (3) receive queries for geolocation-based information, (4) translate the queries into the native data form such as network telemetry; (5) search the stored data based on the translated query; and (6) retrieve the data that satisfies the query. In some embodiments, the system may further (7) translate the retrieved data into the universal coordinate system. In some embodiments, a search of the stored data based on the translated query may include searching a table with stored geofences to determine if the request is related to an existing geofence. Using this approach, in light of the large volumes of location data received from the UEs as compared with the smaller number of searches and requests associated with that data, only translating the raw data that matches the translated query results in an efficiency improvement.

There is an increased efficiency in not translating every single piece of location data received from each UE of the plurality of UEs since a large majority of that data will never even be searched/requested in a query. Thus, the systems and methods discussed herein provide an improvement in processing efficiency and a savings on processing power and associated cost by (1) translating the queries into network telemetry coordinates from the universal coordinate system, (2) searching the data using the translated query, (3) identifying the data that meets the search parameters, (4) translating only the identified data, and (5) returning the translated data in response to the query, including UEs associated with the translated data. The system may be further configured to identify a cell site that is associated with a request, and trap (collect) data from that site. This data may be analyzed to determine what which additional cell sites the UEs in communication with, e.g., which that sites are also receiving signals from the UE(s).

In an embodiment, a telecommunications service provider may establish a plurality of geofences, some of which overlap, in order to understand and analyze both their customers' use (including location and time in a location) of supported UEs as well as the performance of the UE and the cell sites with which the devices communicate. These geofences may each comprise a plurality of cell sites that encompass an area, for example, a first geofence may comprise cell sites in Manhattan, and a second geofence may comprise cell sites in Manhattan, the Bronx, Brooklyn, Staten Island, Queens, and northern New Jersey. These geofences are dynamic, in that they may be grown, shrunk, or multiplied with the growth and movement of a population.

In one example, a cell site may be identified based on a request to push content to a plurality of UE within a geofence. In this example, a request is translated from universal coordinates to network telemetry to determine at least one site that corresponds to the requested coordinates.

In this example, the site may be identified, and part of this identification may involve by generating a "trap" at either of the identified tower or at a telecommunications service provider's server. This trap is configured to capture and in some cases translate network telemetry, and may in some cases trigger the generation of traps at other cell sites or at the provider's server for those other cell sites. These other cell sites may include those that are associated with the same geofence or in geofences adjacent to the identified cell site. In an embodiment, a previously established geofence may be decomposed into a series of ranges, such that if a geofence is formed between sites A, B, C, and D, it may be decomposed into a range of distances from at least one of those sites.

In another example, the system may be trained to identify trends and shifts that may make it desirable to update the geofences. Updating a geofence may comprise adding cell sites and/or removing cell sites from a first geofence. The first geofence may comprise 4 cell sites, and additional cell sites may be added and/or towers of the original cell sites may be removed. In some embodiments, a sub-geofence may be formed inside an existing geofence's polygon. For example, if a geofence currently encompasses a 20-mile radius around a major city and some suburbs, and a host of new companies and entertainment facilities open up adjacent to or removed from the cell sites that comprise that geofence, the systems and methods discussed herein may be used to determine that population growth, e.g., that a density or concentration of UE has grown such that the geofence for that area is expanded to include additional cell sites, some of which may have not been in existence or in use at the time the original geofence was established. Conversely, if a geofence is associated with an area that is primarily populated during the school year (college town) or during a particular season (summer resort, ski resort, etc.), the geofence may be reduced in size or otherwise reconfigured and/or broken down into smaller regions during off-season times.

In an embodiment, a request is received by the telecommunications service provider to push content to UEs in a particular area, e.g., within a geofence or among multiple geofences in different or adjacent locations. The request may be translated as discussed herein to identify the UEs that meet the criteria of the request. The content is then pushed either by the provider or a third party to the identified UEs. Feedback is subsequently received by the telecommunications service provider as to whether (1) the content was delivered, (2) if delivered, whether the content was viewed, (3) where the content was delivered and/or viewed, e.g., was the content delivered to a UE that was in the target area (geofence) requested by the content provider? This enables the system to determine if geofences are to be adjusted. For example, if a geofence comprises four sites in a suburban area, and that area's population increases by 50% over a predetermined period of time, the system may determine that a plurality of UE that were determined to be in the geofence actually received the content when they were outside of the geofence. Depending upon the number of UE that received the content when they were outside of the geofence, and how far outside of the geofence they were (e.g., were the UEs in contact with at least one site of the geofence in addition to other sites?) this may trigger the geofence to be expanded, shrunk, or relocated in order to encompass the newly developed area. Geofences may thus be dynamically updated over time by analysis of not only network traffic but by an analysis of previously transmitted (or attempted transmissions) of content to UE identified in a geofenced area.

FIG. 1 is an illustration of an embodiment of a system 100 according to certain embodiments of the present disclosure. In FIG. 1, the system 100 comprises two servers 104 and 114 that are associated with a telecommunications service provider. The first server 104 comprises at least one application 104a and is in communication with a first data store 108. The at least one application 104a may be referred to as a conversion engine 104a since it is configured to convert location data from a native network telemetry data format to universal coordinates such as longitude and latitude, as well as to convert universal coordinates to the network telemetry data format. The second server 114 comprises at least one application 114a (referred to herein as the second application 114a) in communication with a second data store 116. The second data store 116 may comprise a plurality of geofences, each comprising a plurality of cell sites arranged to form a distinct but dynamically adjusted polygon.

As discussed above, geofences are dynamic in nature and may be adjusted as discussed herein. In some embodiments, the second application 114a and the second data store 116 may also be employed to receive and store feedback from UEs 112 that were targeted, based on the methods discussed herein, for content delivery. This stored feedback may comprise an indication of whether the content was (1) delivered; (2) viewed; (3) if the content was delivered, whether it was delivered to a location within the targeted geofence; and (4) if the content was delivered when the UE was in a location outside the targeted geofence, where the UE was located at the time of delivery. The data may further enable the system 100 to determine if the UE location during the time of content delivery is within another geofence adjacent to or that shares a cell site with the targeted geofence. In some embodiments, the feedback may also include whether the content was viewed while in the targeted geofence, and, in cases where the content was not delivered, there may be an indication of where the UE was located during the attempted delivery. This information may be used to adjust geofences, e.g., to add or remove cell sites to a particular geofence or to form sub-geofences within a larger geofence that encompasses some or all of the sub-geofence. These updates may be stored in the data store 116.

The first and second servers 104 and 114 may be in communication via a network that is local to the telecommunications service provider (not pictured) as well as via a network 102. The servers 104 and 114 may be in communication with a plurality of cell sites 110 via the network 102, as well as with a remote server 106 that may comprise application 106a. It is appreciated that each cell cite 110, which may also be referred to as a cell site, comprises numerous components configured to provide support to the customers as well as to provide feedback to the telecommunications service provider about site performance.

The remote server 106 may be associated with a vendor of the telecommunications service provider or of a third party retailer (e.g., a party who may pay for the services of the provider) and may send queries to the provider for geolocation information. A plurality of user equipment (UE) 112 may be supported by the telecommunications service provider and may send data via an application 112a and the cell sites 110 through the network 102 to at least one of the first 104 or second servers 114.

In one example, the first server 104 is configured to receive a plurality of information via the application 104a including location information from the plurality of UE 112.

This information may comprise location and operational information and may be sent to the server 104 at a plurality of pre-determined intervals and/or in response to at least one cell site with which the UE 112 is in communication pinging the UE 112. The pluralities of data transmitted by the cell sites 110 based on signals received from the UE 112 to the first server 104 may be in the native network telemetry data form. This information may be directly stored in the data store 108 upon receipt without further processing, analysis, or conversion. The first server 104 may receive a plurality of requests/queries from other applications on the server 104, or from the second server 114, or from a remote server 106 for location information about the plurality of UE 112. These requests may be for discrete portions of the pluralities of data received by the first server 104, and may contain coordinates in a universal coordinate system.

In an embodiment, the application 104a receives the requests, and translates/converts the coordinates in the request to the native network telemetry data form to determine if the request is for an existing geofence. The application 104a may either return identities of addresses (identifier) of UEs within that geofence or determine, if there is no geofence corresponding to the translated request or if there is more than one geofence associated with the translated request, what UEs location information is associated with the translated location(s). The application 104a may then search and parse the data store 108 for data in its native form that corresponds to and/or falls within the translated request. This data may be identified by UE 112 and/or by cell site 110 and/or sites that fall within the requested region. The location data identified may be transmitted to the requesting party, and the request and resultant location data may be stored in the data store 116. A plurality of geofences may have been previously generated based on the native network telemetry data form received from the plurality of UE. These geofences are virtual geographic boundaries that may be defined in terms of the native network telemetry data form, longitude and latitudes, or otherwise, to form a polygon that may or may not contain other sub-geofence polygons. Geofences may be used to push content from the telecommunications service provider or from third parties when UEs enter, leave, or remain in a particular geofenced area for a predetermined amount of time.

In another embodiment, the requests received by the application 104a may be used to determine not only the UEs with location data within a predetermined range, which may also be referred to as a geo-fence, but may additionally or instead of determining the UEs may determine at least some cell sites of the plurality of cell sites 110 that fall within the geofence. In this example, the application 104a may identify the at least some cell sites and trap (capture) and translate the native network telemetry data form to a universal coordinate system (such as latitudes and longitudes) upon the application's 104a receipt of the data from those identified cell sites. This identification may comprise or trigger in a separate, subsequent step, generating a "trap" or point in the system at the cell site 110 wherein the native network telemetry data form from the identified cell site 110 is captured at that point. In this embodiment, the pluralities of location information received from the UEs 112 is converted to a non-native format such as longitude and latitude at the cell site 110 or at the server 104 via the conversion application 104a prior to being stored in the data store 108, and the translated information, in addition to or instead of the identified cell sites, may be sent to the requesting party. In another embodiment, generating a trap to capture data at a particular cell site 110 may also cause other cell sites 110 to trap and translate or at least transmit data to the application 104a. These other cell sites may be, for example, cell sites associated with the same geofence or with adjacent geofences to that of the identified site 110, or cellular sites within a predetermined range of the identified site 110.

Figure 2:
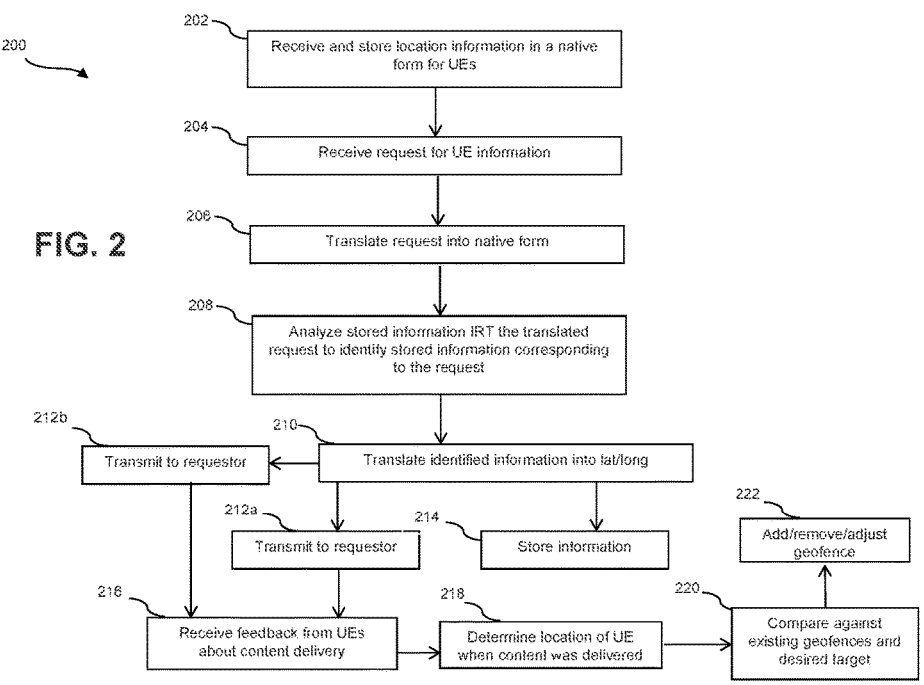
FIG. 2 is a flow chart of a method according to certain embodiments of the disclosure.

FIG. 2 is embodiment flowchart of a method 200 of administration of management services. In the method 200, at block 202, an application stored on a telecommunications service provider's server receives and stores a plurality of UE location data in a native form, e.g., in the native network telemetry data form, from a plurality of UEs supported by the provider. At block 204, the application receives a request to distribute content to a plurality of UE on its network. The request comprises a desired area for distribution such that UEs that are in the desired area are identified to receive the content, and the desired area is expressed via universal geo-coordinates such as latitude and longitude. At block 206, the request is translated into the native network telemetry data form. Based on the resulting network telemetry data form that may be represented as a range of distance from a point, a geographic area that may be represented by one or more geofences is determined as the target area, and, at block 208, based on the translation at block 206, the data stored at block 202 is parsed to identify a plurality of UE that meet the geographic criterion of the request. At block 210, the plurality of UE identified at block 208 are translated from the native network telemetry data form into coordinates corresponding to those in the original request, for example, latitude and longitude. At block 212a, the requested information, e.g., a plurality of UE identities (identifiers) of UE located within the requested parameters, is transmitted to the requestor in its translated form. At block 214 the translated information may be stored for later use and analysis as discussed in embodiments herein.

In an embodiment, the requestor, who may be a vendor such as an advertiser or a division of the telecommunications service provider associated with a specific function (accounting, sales) or brand, may receive the requested information including the UE information for the UEs located within their desired area (geofence). In alternate embodiments, the request sent to the provider at block 204 includes content to push to the UEs once they are identified based on the request, and the provider transmits the content to the UEs at block 212b. In this example, at block 216, the provider receives, from the UEs identified to receive the content, a plurality of content receipt data. The plurality of content receipt data comprises at least one of an indication of whether the content was received by the UE and a location of the UE when the content was received. At block 218, the application analyzes the content receipt data to determine (1) whether the content was received; (2) whether the content was viewed; (3) where the UE was when the content was received; (4) where UEs were located that did not receive the content. At block 220, the application can compare the locations of UE that received and/or viewed the content at the time of receipt, e.g., to determine whether the UE were located within the geofence as anticipated. Based on that analysis at block 220, at block 222, the geofence may be modified to comprise more or less cell sites.

Figure 3:
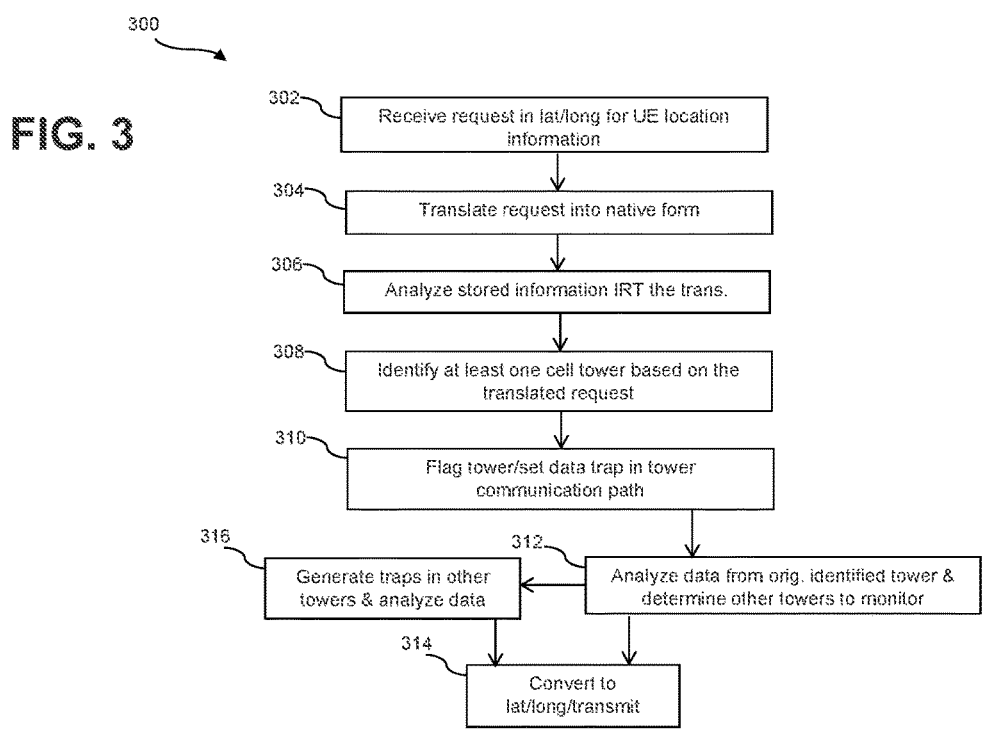
FIG. 3 is a flow chart of a method according to certain embodiments of the disclosure.

FIG. 3 is embodiment flowchart of a method 300 of administration of location services. In the method 300, at block 302, an application stored on a telecommunications service provider's server receives a request for a plurality of UE identities located in a particular geolocation. The request comprises the geolocation information in a format such as longitude and latitude, which is translated at block 304 into the corresponding native network telemetry data form. At block 306, the stored information is parsed based on the translated request in a similar fashion to the translation that occurs at block 206 in the method 200 in FIG. 2. At block 308, based on the parsing at block 306, the application identifies at least one cell site associated with the requested geolocation. The site identified at block 308 is identified at block 310, this identification may comprise generating a data trap at the site and/or at the telecommunications service provider's server such that data from that site is captured and analyzed at block 312 before translation to a non-native form. The analysis at block 312 may identify the plurality of UE generating the location data via communications with the cell site identified at block 308, and may also determine what other cell site the plurality of UE were in communication with at the same time they were in communication with the site identified at block 308. By identifying one or more sites that the UEs were in communication with at the same time as the site identified at block 308, the location of those UEs within a geofence may be more reliably determined than if only one cell site was used in this analysis.

At block 316, at least some of the other cell sites determined to be in communication with the plurality of UE at block 312 have traps generated either at those sites or at the telecommunications provider's server. These traps capture and transmit or translate data from those sites to determine if the identified UE are within the geolocation (geofence) in the request received at block 302. This determination at block 316 may be made based upon whether the UEs identified as being in communication with the initially identified site are also in communication with one or more of the other sites simultaneously for a predetermined period of time, which may indicate that the UEs were within the geofence. At block 314, the location information of at least one of the plurality of UE identified at block 312 or a plurality of UE confirmed to be in the requested geolocation based on the data obtained and analyzed at block 316 is translated into a non-native network telemetry data form, for example, latitude and longitude. This information may be transmitted and/or stored in the form of UE identifications that enable transmission of content to the UEs identified as meeting the request parameters of the request received at block 302.

Figure 4:
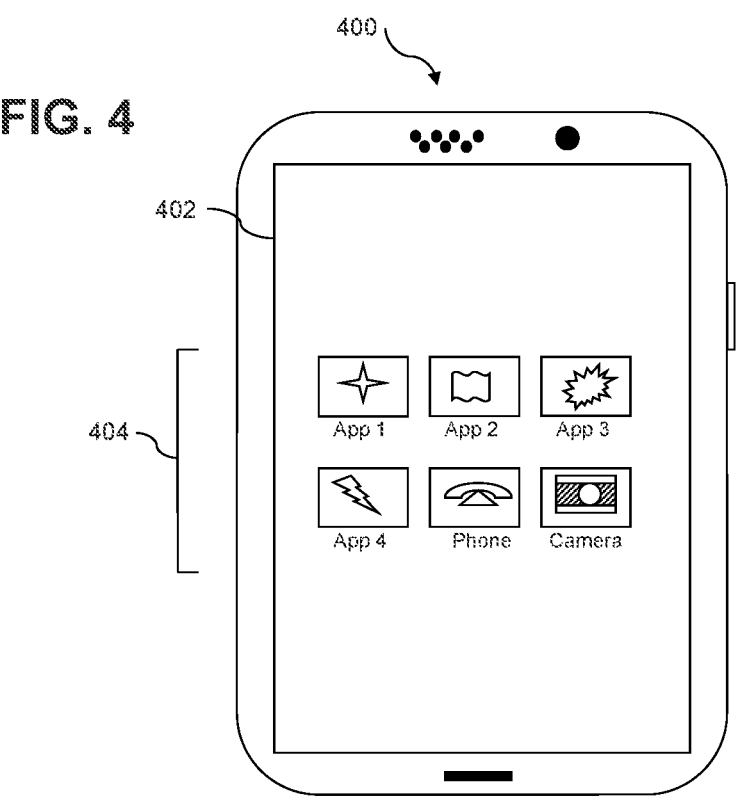
FIG. 4 is an illustration of user equipment (UE) according to certain embodiments of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
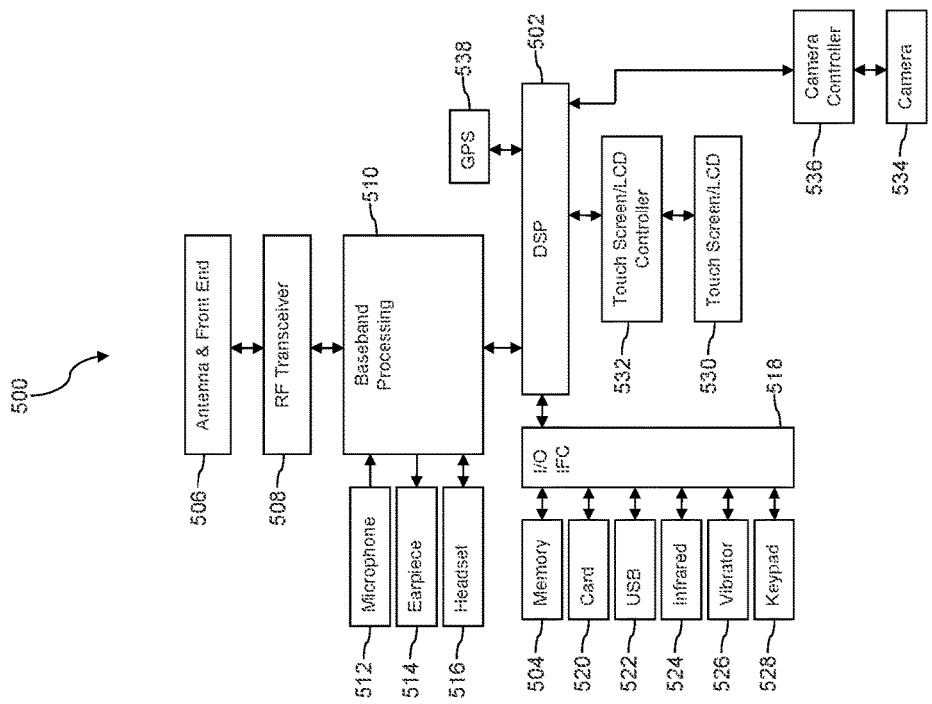
FIG. 5 is a block diagram of a configuration of hardware architecture of a handset according to certain embodiments of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identifier (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
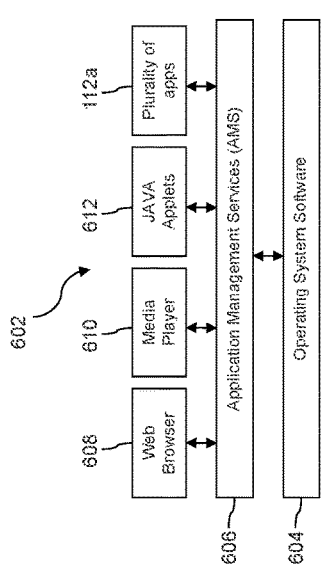
FIG. 6A is a block diagram of a software architecture of a handset according to certain embodiments of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, a plurality of applications represented by 112*a* that includes a location services application, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
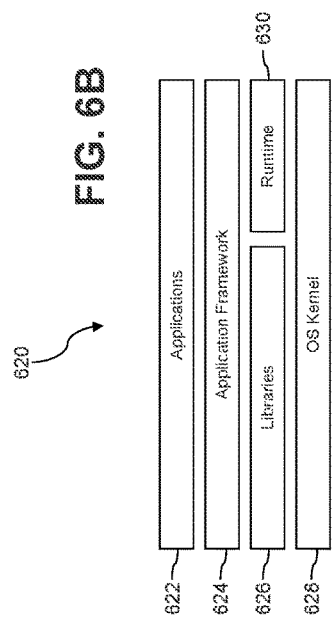
FIG. 6B is a block diagram of another software architecture of a handset according to certain embodiments of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
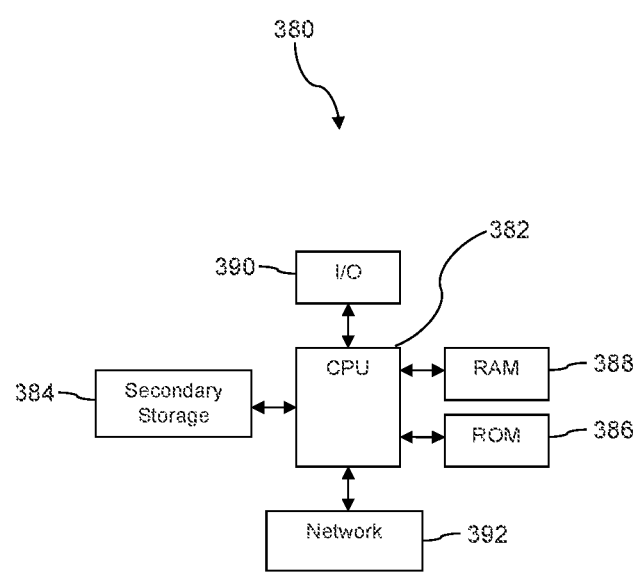
FIG. 7 is a block diagram of a computer system according to certain embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for maintaining location services, comprising:
    an application stored in a non-transitory memory of a telecommunications provider server and executable by a processor to:
        receive a plurality of location information expressed as a plurality of network telemetry values from a plurality of user equipment (UEs);
        store the plurality of location information;
        receive a request for identification information of UE within a geographic location expressed using a plurality of latitudes and a plurality of longitudes;
        translate the geographical location in the request from the plurality of latitudes and the plurality of longitudes into corresponding network telemetry values;
        analyze the stored plurality of location information based on the translated geographical location in the request;
        identify, based on the analysis, a portion of the plurality of location information that corresponds to the translated geographic location in the request and a subset of UEs of the plurality of UEs associated with the identified portion of the plurality of location information;
        translate the identified portion of location information from network telemetry values into a corresponding plurality of latitudes and longitudes; and
        transmit identification information of the subset of UEs associated with the identified portion of the plurality of location information to a party associated with the request.

2. The system of claim 1, wherein the request is received from an entity of the telecommunications service provider associated with a different server or a vendor.

3. The system of claim 1, wherein the request comprises content and the application is further configured to transmit the content to the subset of UEs associated with the portion of translated location information.

4. The system of claim 1, wherein the plurality of network telemetry values associated with the plurality of location information are associated with a plurality of cell sites supported by the telecommunications service provider's network.

5. The system of claim 1, wherein the plurality of UEs comprises laptops, desktops, personal digital assistants (PDA), tablets, wearable technology, mobile phones, and smart phones.

6. A method of maintaining location services, each step of the method performed by an application stored in a non-transitory memory of a telecommunications provider server and executed by a processor of the telecommunications provider server, the method comprising:
    receiving a request comprising content and a geofence expressed using a plurality of latitudes and a plurality of longitudes;
    translating the geofence in the request from the plurality of latitudes and the plurality of longitudes into corresponding network telemetry values;
    analyzing, in response to receipt of the request, a plurality of location information associated with a plurality of user equipment (UEs) and stored in the non-transitory memory;
    identifying, based on the analysis, a portion of the plurality of location information that corresponds to the translated geofence in the request;
    identifying, based on the analysis, a cell site associated with the identified portion of the plurality of location information;
    receiving from the identified cell site, a plurality of location information from a plurality of UEs in communication with the identified cell site, wherein the plurality of location information from the plurality of UEs in communication with the identified cell site is accumulated via a trap;
    translating the plurality of location information received from the identified cell site from network telemetry values into a corresponding plurality of latitudes and longitudes; and
    transmitting identification information of the plurality of UEs in communication with the identified cell site to a party associated with the request.

7. The method of claim 6, wherein the trap is generated at the cell site.

8. The method of claim 6, wherein the trap is generated at the telecommunications provider server.

9. The method of claim 6, further comprising:
    determining based on the plurality of location information captured by the trap, at least one other cell site that each of the plurality of UEs is in communication with at the same time as it is in communication with the identified cell site;
    generating a trap for the at least one other cell site;
    analyzing data from the traps at the identified cell site and the at least one other cell site; and
    determining which UEs of the plurality of UEs are in communication with the at least one other cell site and the identified cell site at the same time.

10. The method of claim 9, further comprising: transmitting the content from the request to the UEs of the plurality of UEs determined to be in communication with the at least one other cell site and the identified cell site at the same time.

11. A method of maintaining location services, comprising:
    receiving, by an application stored in a non-transitory memory of a telecommunications provider server, a request to distribute content to user equipment (UE) in a target area, wherein the target area is expressed using a plurality of latitudes and a plurality of longitudes and comprises a geofence;

translating, by the application, the request into a corresponding native network telemetry data form;

in response to receipt of the request, analyzing, by the application, a plurality of location information received for a plurality of UEs by a plurality of cell sites, wherein the plurality of location information is received in the native network telemetry data form;

identifying, by the application, based on the analyzing, a portion of the plurality of location information that corresponds to the geofence;

identifying, by the application, UEs of the plurality of UEs associated with the portion of the plurality of location information;

translating, by the application, the portion of location information into a plurality of latitudes and a plurality of longitudes, wherein the identified UEs receive the content subsequent to translating the portion of location information;

receiving and analyzing, by the application, from the identified UEs, a plurality of content receipt data comprising at least one of an indication of whether the content was received by the UE and a location of the UE when the content was received; and modifying, subsequent to the analyzing of the plurality of content receipt data, the geofence.

12. The method of claim 11, further comprising determining, by the application, subsequent to receiving the plurality of content receipt data, whether the identified UEs which received the content were within the geofence at the time of receipt.

13. The method of claim 11, further comprising determining, by the application, subsequent to receiving the plurality of content receipt data, whether the identified UEs which did not receive the content were within the geofence at the time of receipt.

14. The method of claim 11, further comprising determining, by the application, subsequent to receiving the plurality of content receipt data, whether the identified UEs which received the content were within the geofence at a time the content was viewed.

15. The method of claim 11, further comprising determining, by the application, subsequent to receiving the plurality of content receipt data, a location of the identified UEs which received the content but which were not within the geofence at the time of receipt.

16. The method of claim 11, wherein modifying the geofence comprises either adding at least one cell site to the geofence, removing at least one cell site from the geofence, or generating a sub-geofence.

17. The method of claim 16, wherein the sub-geofence is one of within the geofence or shares at least two cell sites in common with the geofence.

* * * * *